United States Patent [19]
Richards et al.

[11] 3,901,950
[45] Aug. 26, 1975

[54] PROCESS FOR THE CHLORINATION OF TRANS-1,4-DICHLORO-2-BUTENE TO MESO-1,2,3,4-TETRACHLOROBUTANE

[75] Inventors: John H. Richards, Bradbury, Calif.; Clare A. Stewart, Jr., Wilmington, Del.

[73] Assignee: E. I. Du Pont de Nemours and Company, Wilmington, Del.

[22] Filed: Oct. 4, 1972

[21] Appl. No.: 294,987

[52] U.S. Cl. ............................ 260/658 R; 260/655
[51] Int. Cl.² ...................................... C07C 17/04
[58] Field of Search ............................ 260/658 R

[56] References Cited
UNITED STATES PATENTS
2,445,729  7/1948  Radcliffe et al. .................. 260/660
3,082,262  3/1963  Scott .............................. 260/652.5
FOREIGN PATENTS OR APPLICATIONS
1,019,149  2/1966  United Kingdom ............ 260/658 R
1,019,131  2/1966  United Kingdom ............ 260/658 R

OTHER PUBLICATIONS

Gould, "Mechanism and Structure in Organic Chemistry," p. 693 (1959).

*Primary Examiner*—Joseph E. Evans
*Assistant Examiner*—Nicky Chan

[57] ABSTRACT meso-1,2,3,4-Tetrachlorobutane, an important starting material for the preparation of 2,3-dichloro-1,3-butadiene, is obtained in high yields by contacting at 0°–120°C. elemental chlorine with trans-1,4-dichloro-2-butene in the presence of a free radical inhibitor and a chloride ion source. 2,3-Dichloro-1,3-butadiene, which can be made by dehydrochlorination of meso-1,2,3,4-tetrachlorobutane, can be polymerized or copolymerized to useful products.

10 Claims, No Drawings

3,901,950

1

PROCESS FOR THE CHLORINATION OF TRANS-1,4-DICHLORO-2-BUTENE TO MESO-1,2,3,4-TETRACHLOROBUTANE

BACKGROUND OF THE INVENTION

This invention relates to a process for the preparation of meso-1,2,3,4-tetrachlorobutane by chlorination of trans-1,4-dichloro-2-butene.

meso-1,2,3,4-Tetrachlorobutane is an important starting material for the preparation of 2,3-dichloro-1,3-butadiene, which is a valuable monomer capable of homopolymerization or copolymerization, giving useful materials. Copolymers of 2,3-dichloro-1,3-butadiene with chloroprene are described in U.S. Pat. Nos. 1,965,369 and 3,082,262. While 2,3-dichloro-1,3-butadiene can be conveniently made by dehydrochlorination of either the meso-isomer or the $d,1$-racemate, the latter dehydrochlorinates in lower yield and produces undesirable contaminants.

Highly selective chlorination of trans-1,4-dichloro-2-butene to meso-1,2,3,4-tetrachlorobutane was reported by Pudovik, J. Gen. Chem. U.S.S.R. (Engl. transl.) 19, 1173 (1949), who carried out the reaction in chloroform solution at low temperature. In addition to the fact that chloroform is economically unattractive for the large scale industrial processes and that refrigeration is expensive, the Pudovik process suffers from additional limitations. It has been found that the selective chlorination does not take place when the chloroform is carefully purified and does not contain its customary stabilizer. The same lack of selectivity is observed when the chlorination is carried out in the absence of air.

meso-1,2,3,4-Tetrachlorobutane also has been made by chlorination of butadiene, as disclosed in U.S. Pat. No. 2,445,729 and British Pat. Nos. 1,019,149 and 1,019,131. The proportion of the meso-isomer was about 65-75%.

There is a need for a simple, reliable, and economically attractive process for producing meso-1,2,3,4-tetrachlorobutane in high yields.

SUMMARY OF THE INVENTION

According to this invention, there is now provided a process for the chlorination of trans-1,4-dichloro-2-butene to meso-1,2,3,4-tetrachlorobutane wherein trans-1,4-dichloro-2-butene is contacted with elemental chlorine at about 0–120°C., in the presence or absence of a solvent and in the presence of a chloride ion source which provides at least $1 \times 10^{-3}$ gram formula weight of dissolved chloride ion per kilogram of reactor solution and also in the presence of a free-radical inhibitor.

Under the optimum conditions, the desired reaction can be carried out in nearly quantitative yield, based on the amount of meso-1,2,3,4-tetrachlorobutane formed from trans-1,4-dichloro-2-butene.

DETAILED DESCRIPTION OF THE INVENTION

The process of the present invention can be carried out in either a continuous or a batch operation in many different ways, but it usually involves introduction of elemental chlorine into a well-agitated mixture of trans-1,4-dichloro-2-butene and the chloride ion source in the presence of the free radical inhibitor. The preferred solvent, for economic reasons, is the molten product, meso-1,2,3,4-tetrachlorobutane. Because this material as formed melts at a rather high temperature

2 of about 70°C., it often is desirable to add other solvents, which can subsequently be recovered; thus permitting operation at a lower temperature with lower requirements for mixing to avoid, for example, local excesses of chlorine or overheating. For this purpose, carbon tetrachloride, which is resistant to chlorination, is the preferred diluent. Other chlorinated hydrocarbons, including chloroform, ethylene chloride and trichloroethane, and inexpensive aliphatic or aromatic hydrocarbons, such as hexane, isooctane, cyclohexane, heptane, benzene, and xylene also can be used.

Various free radical inhibitors can be used in the process of this invention, including various phenols and aromatic amines well known to those skilled in the art. These conventional free radical inhibitors, however, are soon deactivated by chlorine and are not practical for industrial applications. The most practical and the cheapest free radical inhibitor is oxygen, which is preferably added as dry air to the stream of chlorine. It will be readily understood, of course, that this manner of introduction of oxygen into the reacting mixture is not critical and can be varied without departing from the spirit of the invention. While the amount of oxygen will vary with the concentrations of the reactants and with the degree of agitation, it has been observed that adequate inhibition is obtained when the partial pressure of oxygen in equilibrium with the reaction mixture is at least about 1 mm Hg. Higher concentrations of oxygen, for example 150 mm Hg and more, can be used without adversely affecting the operability of the process, provided the equipment is sufficiently corrosion resistant.

Elemental chlorine will usually be introduced in gaseous form for reasons of convenience. It is understood, however, that liquid chlorine or solutions of chlorine in inert solvents also are suitable, provided localized high concentrations of chlorine are avoided. Usually, a stoichiometric amount of chlorine is introduced into the reacting mixture; lesser amounts result in decreased conversion of dichlorobutene to the desired product, while larger amounts may lead to overchlorination and formation of undesirable side-products. It is advantageous to use a slight excess of chlorine (101–105% of the required amount being used most conveniently) and to promptly remove the unchanged chlorine after the desired reaction is complete.

The reaction temperature is preferably maintained at about 70°–100°C. Below this range, the solid product may precipitate; while above it, further chlorination of the product or of the solvent may occur, especially when agitation is not sufficiently vigorous. Within this range, the product itself may provide the reaction medium without additional solvent. However, with adequate agitation, chlorination-resistant solvent, and sufficient dilution, lower or higher temperatures can be used successfully. If used, the amount of solvent should be sufficient to allow good agitation. Preferably, the weight proportion of solvent should not be more than about 80% of the reaction mass, exclusive of chlorine. This proportion is not critical, however, and larger amounts can be used without interfering with the operability of the invention.

The chloride ion catalyst, which is an essential part of this invention, may be added to the reaction mixture in the form of a chloride salt or in the form of a material which will react with a component of the reaction mixture to produce a chloride ion *in situ*. The chloride ion source should be sufficiently soluble to provide at least about $1 \times 10^{-3}$ gram formula weight of dissolved chloride per kilogram of reactor solution. For practical reasons, no more than $100\times10^{-3}$ gram formula weight per kilogram of solution is needed nor would produce significantly improved results but would be wasteful of materials. The preferred concentration of chloride ion in the reaction solution is $2\times10^{-3}$ to $20\times10^{-3}$ gram formula weight per kilogram.

For the purpose of the present disclosure, it is preferred to express the chloride ion concentration in terms of gram formula weight, rather than in terms of moles, equivalents, or grams. An alternative expression would be "gram-ion", but this term does not have a generally accepted meaning.

The concentration of the dissolved chloride salt, whether added as such or formed in the reaction medium, can be readily determined by conventional means that will be obvious to one skilled in the art.

The preferred cations associated with the chloride ion are organic. Many inorganic salts are not sufficiently soluble in the reaction medium or are difficult to handle. Others catalyze undesirable side reactions, such as polymerization and degradation of the starting material or product.

Examples of suitable compounds which can be added as sources of chloride ion to the reaction mixture are quaternary ammonium chlorides, quaternary phosphonium chlorides, and tertiary sulfonium chlorides. Hydrochlorides of primary, secondary, or tertiary amines can also be added.

Examples of materials which may be added to form the chloride ino in situ include amines, either primary, secondary, or tertiary, or the analogous phosphines or sulfides in which the radicals on the nitrogen, phosphorus, or sulfur atoms may be of the same general types discussed below. These compounds are capable of reacting with one or more of the chloride-substituted materials in the reaction mixture of with hydrogen chloride to form a chloride ion. Other examples of precursors of chloride ions are salts in which the anion is not a chloride ion but whch can undergo an ion exchange reaction in the reaction medium to produce a chloride ion.

The organic radicals on the nitrogen, sulfur, or phosphorus atoms may be of many different types. These organic radicals may all be hydrocarbon radicals which may be aliphatic or aromatic, or the radicals may include both aliphatic or aromatic species (that is, e.g., alkaryl or aralkyl radicals). The aliphatic radicals may be cyclic or acyclic, saturated or unsaturated. In general, there is no advantage in having radicals which contain more than 20 carbon atoms. The hydrocarbon radicals may be substituted with other non-hydrocarbon groups such as halogen (fluorine, chlorine, bromine, or iodine), hydroxyl, ether, oxo, carboxy, sulfonyl, sulfo, carboxamide, and cyano groups. The carboxy and sulfo groups may be esterified with organic hydroxy compounds, usually alcohols having up to 6 carbon atoms, although this is not critical. The ether groups may connect any two radicals of the type specified above. The ether oxygens may be located in a chain, for example, in polyalkylene ether compounds, or in a ring.

The nitrogen, sulfur, or phosphorus atoms of the cation may form a part of a heterocyclic ring, usually containing 5 to 7members, which may be saturated or unsaturated. The rings may contain more than one nitrogen, phosphorus, or sulfur atoms or may contain another heteroatom such as oxygen. The rings may be fused with isocyclic or heterocyclic rings to form polycyclic systems.

The primary, secondary, or tertiary amines or the analogous phosphorus compounds (phosphines) or sulfides bear substituents of the same general type described above.

Specific examples of suitable chloride ion sources are so numerous that it would be impractical to recite all possibilities. The following specific examples are only representative and are not intended to be an exhaustive listing. Other examples will be readily apparent to one skilled in the art, and the suitability of a compound can easily be ascertained by a conventional determination of its solubility in the reaction medium or the solubility of the salt which will be formed in situ.

The preferred source of the chloride ion is a quaternary ammonium chloride. Many suitable quaternary ammonium chlorides are available commercially as surface active agents. In these, at least one radical directly or indirectly attached to the nitrogen often contains an aliphatic radical containing at least 8 carbon atoms. Often these long chains are derived from fats or oils and thus the composition is a mixture of compounds containing chains of varying lengths, usually ranging between 8 and 20 carbon atoms, which may contain ethylenic unsaturation. In many of these surface active compounds one radical is benzyl or benzyl substituted with various alkyl radicals, such as methyl, nonyl, or dodecyl. Many of the surface active agents contain also hydroxy, ether, sulfo or carboxy groups in addition to the quaternary ammonium group.

Examples of quaternary ammonium compounds in which the radicals are attached to the nitrogen are the following:
butyltriethylammonium chloride
dilauryldimethylammonium chloride
benzyllauryldimethylammonium chloride
amyltriethylammonium chloride
tetraoctylammonium chloride
hexyltrimethylammonium chloride
(mixture of $C_{12}$-$C_{14}$-alkyl)benzyldimethylammonium chloride
(methyldodecylbenzyl)trimethylammonium chloride
trimethyl(3-phenylpropyl)ammonium chloride
trimethyl-2-naphthylammonium chloride
cyclohexylhexadecylmethylpropylammonium chloride
dodecyldimethyl(naphthylmethyl)ammonium chloride
(cyclohexylmethyl)trimethylammonium chloride
cyclooctyltrimethylammonium chloride
(13-cyclopentyltridecyl)trimethylammonium chloride
(2-cyclopenten-1-yl)dimethyl(2-methyl-2-butenyl)-
 ammonium chloride
trimethylphenylammonium chloride
decyltrimethylammonium chloride
trimethyl[(2-methyl-1-naphthyl)methyl]ammonium chloride
trimethyl(p-styrylphenyl)ammonium chloride Representative compounds in which the organic radicals are substituted with various functional groups include:
(tert-octylcresoxyethoxyethyl)dimethylbenzyl-
 ammonium chloride
($C_{12}$-$C_{18}$-alkyl)benzylbis(2-hydroxypropyl)ammonium chloride
($C_{12}$-$C_{18}$-alkyl)benzylbis(2-hydroxyethyl)ammonium chloride
($C_{12}$-$C_{18}$-alkylbenzyl)tris(2-hydroxyethyl)ammonium chloride bis(2-hydroxyoctadecyl)dimethylammonium chloride
bis(3-hexadecyloxy-2-hydroxypropyl)dimethylammonium chloride
(1-carboxyheptadecyl)trimethylammonium chloride
(m-hydroxyphenyl)trimethylammonium chloride
(3-formyl)-4-hydroxybenzyl)trimethylammonium chloride
(1-formyl-2-hydroxypropyl)trimethylammonium chloride
trimethylphenacylammonium chloride
triethyl(2-oxopentyl)ammonium chloride
(oxydiethylene)bis[dimethyloctadecylammonium chloride]
(3,4-dibutoxybenzyl)trimethylammonium chloride
triethyl($\beta$-hydroxyphenethyl)ammonium chloride
(carboxymethyl)dodecyldimethylammonium chloride and esters thereof
(sulfonyldiethylene)bis(trimethylammonium chloride)
furfuryltrimethylammonium chloride
dodecyl(methoxybenzyl)dimethylammonium chloride
(3-cyanopropyl)trimethylammonium chloride
(p-chlorobenzyl)hexadecyldimethylammonium chloride
(3-chloro-2-butenyl)dimethylphenylammonium chloride
(2-chloroethyl)(5-methoxy-2-pentenyl)dimethylammonium chloride
(carboxymethyl)trimethylammonium chloride, benzyl ester
(trimethyl(stearamidomethyl)ammonium chloride A group of compounds containing either hydroxyl groups or ether linkages may, e.g., be represented by the structure

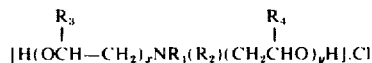

wherein $R_1$ and $R_2$ are independently alkyl radicals containing up to 20 carbon atoms or benzyl or a $(C_1-C_{20})$-alkyl-substituted benzyl radical; $R_3$ and $R_4$ are independently H or methyl; each of $x$ and $y$ is at least 1, and the sum of $x + y$ ranges from 2 to 15.

Representative compounds in which the nitrogen is located in a ring are as follows:
1-methylpyridinium chloride
1-cetylpyridinium chloride
4-cetyl-4-ethylmorpholinium chloride
1-ethyl-1(2-hydroxyethyl)-2-heptadecenylimidazolium chloride
1-dodecylquinaldinium chloride
1-(dodecyloxymethyl)pyridinium chloride
1-ethyl-1-(2-hydroxyethyl)-2-heptadecenylimidazolium chloride
1-benzyl-1-methylpiperidinium chloride
2-(carboxymethyl)-1,1-dimethylpiperidinium chloride
1-benzyl-1-(3-cyano-3,3-diphenylpropyl)piperidinium chloride
1-benzyl-1-(decahydro-2-naphthyl)piperidinium chloride Representative examples of suitable quaternary phosphonium compounds are as follows:
tetrabutylphosphonium chloride
methyltrioctylphosphonium chloride
benzyldimethyl(3,5,5-trimethylhexyl)phosphonium chloride
dodecyltrimethylphosphonium chloride
trimethyloctadecenylphosphonium chloride
trimethyl(octadecenylphenyl)phosphonium chloride
diamylmethyl(4-ethylphenyl)phosphonium chloride
trimethyl(2,4-dimethylphenyl)phosphonium chloride
ethylenebis(triethylphosphonium chloride)
triethyl(2-bromoethyl)phosphonium chloride
triethyl(2-hydroxyethyl)phosphonium chloride
trimethyl(carbethoxymethyl)phosphonium chloride
2,4-dichlorobenzyltributylphosphonium chloride
benzyl(2,2-dimethyl-5-oxo-3-undecenyl)dimethylphosphonium chloride
(2-hydroxyethyl)tricyclopentylphosphonium chloride
(2-acetoxyethyl)tributylphosphonium chloride
[2-(p-toluenesulfonyloxy)ethyl]tridodecylphosphonium chloride
vinyldiphenylnaphthylphosphonium chloride
1-cyclohexyl-1-methylphospholanium chloride
1-benzyl-1,2-dimethyl-3-phospholenium chloride
acetonyltributylphosphonium chloride
(carboxymethyl)trioctylphosphonium chloride
(2,4-dichlorobenzyl)triphenylphosphonium chloride
(3-formyl-2-butenyl)triphenylphosphonium chloride Representative examples of suitable tertiary sulfonium compounds include the following:
trimethylsulfonium chloride
dihexylethylsulfonium chloride
methyldioctadecylsulfonium chloride
propyldibutylsulfonium chloride
dimethylcyclohexylsulfonium chloride
1,6-hexamethylenebis(diethylsulfonium chloride)
1-(o-bromobenzyl)hexahydrothiopyrilium chloride
1-allyl-2,5-dihydrothiophenium chloride
1-benzyltetrahydrothiophenium chloride
1-(2-carboxyethyl)tetrahydrothiophenium chloride
2,5-dihydro-1-octadecylthiophenium chloride
1,1'-ethylenebis(oxyethylene)bis[2,5-dihydrothiophenium chloride]

It is to be understood that, instead of the specifically recited chloride anion, other anions may be originally present; for example, fluoride, bromide, iodide, lower fatty acid ions, alkylsulfate ions, alkylphosphate ions, etc., which will undergo an ion exchange reaction *in situ* to produce a chloride ion.

Examples of amines, phosphines or sulfides will be apparent from the long list of salts cited above. For example, any tertiary amine can be used which corresponds to the quaternary compound except that there are only three radicals on the nitrogen. Similarly, representative primary or secondary amines, phosphines, or sulfides may have any of the typical groups listed above under the examples of the ammonium, phosphonium or sulfonium compounds. The amines may be added as the hydrochlorides or other salts in which the anion will be replaced *in situ* by chloride, as discussed above for the quaternary ammonium compounds. It is usually convenient to add the amine as the free base which can react to form a chloride ion in the reaction mixture.

In the reaction medium of the present invention chloride ions associate reversibly with other components of the solution forming, for example, trichloride ions ($Cl_3^-$) with chlorine and bichloride ions ($HCl_2^-$) with hydrogen chloride. It is to be understood that these associated chloride ions are included in calculating the concentration of dissolved chloride ion.

When the starting trans-1,4-dichloro-2-butene is prepared by chlorination of butadiene, impurities present include the lower-boiling isomeric 3,4-dichloro-1-butene and cis-1,4-dichloro-2-butene and a smaller proportion of higher-boiling and nonvolatile products, including some tetrachlorobutanes. For the purpose of this invention, it is desirable to remove to a reasonable degree the isomeric dichlorobutenes since, if not removed, they will produce the undesired $d$,1-racemate. (For example, it is preferred that the starting material should contain no more than about 10% of the lower-boiling isomeric dichlorobutenes). It is not necessary, however, to remove the higher-boiling impurities in the starting material since these impurities will undergo chlorination and subsequent dehydrochlorination to yield small amounts of 2,3-dichlorobutadiene and higher-boiling impurities which can be readily removed. For example, after the chlorination according to the present invention of the crude mixture containing the high-boiling impurities, pure meso-1,2,3,4-tetrachlorobutane may be obtained by crystallization from the crude product. Alternatively, the crude chlorination product can be dehydrochlorinated directly to 2,3-dichloro-1,3-butadiene.

This invention is now illustrated by the following examples of certain preferred embodiments thereof, wherein all parts, proportions, and percentages are by weight unless otherwise indicated.

EXAMPLE 1

I. The starting material is dichlorobutene which contains 96.4 percent trans-1,4-dichloro-2-butene, 1.8 percent cis-1,4-dichloro-2-butene, and 1.3 percent 3,4-dichloro-1-butene. The catalyst is ($C_{12}$-$C_{16}$-alkyl)benzyldimethylammonium chloride ("Hyamine" 3500, Rohm and Haas Co., which is an 80 percent solution in ethanol. Percent catalyst is based on the active ingredient.)

A solution containing 17.15 g. (0.137 mole) of dichlorobutene, 0.2 g. (0.25 percent of the reaction mixture, exclusive of chlorine, 6.8 × 10$^{-3}$ gram formula weight per kilogram) of the catalyst, and 30 ml of carbon tetrachloride is placed in an open Erlenmeyer flask and magnetically stirred. Chlorine gas is introduced at a rate of about 100 ml per minute for 28 minutes at 20°–37°C until excess chlorine is observed (by yellow color). When the reaction mass is analyzed by vapor phase chromatography, no unchanged dichlorobutene is found, and the product contains approximately 96 percent of the desired meso-1,2,3,4-tetrachlorobutane, 2.8 percent of the $d$,1-racemate, and 1.2 percent of other impurities. Reactants and products are analyzed by gas-liquid chromatography using an 8-ft column containing 10% SE-52 silicone rubber (General Electric Co.) on a treated diatomaceous earth support ("Gas-Chrom" Q, Applied Science Laboratories, Inc.) with temperature programming from 30°C at 10°C temperature rise per minute. Quantities are calculated from area analyses and response factors determined from known standards.

II. When the same procedure is followed but the quaternary ammonium catalyst is omitted, and the same amount of chlorine gas is introduced, only 52 percent of the starting material is converted. The reaction product contains 40 percent of $d$,1-1,2,3,4-tetrachlorobutane and larger amounts of other impurities (believed to be substitution products) than are obtained in the preceding experiment I using the catalyst.

III. In another run, the dichlorobutene is added to a stoichiometric excess of chlorine already dissolved in carbon tetrachloride. No catalyst is present. The product consists of nearly equal amounts of $d$,1- and meso-1,2,3,4-tetrachlorobutane contaminated with larger amounts of substitution products than those obtained in run II.

EXAMPLE 2

The same equipment is used as described in EXAMPLE 1. The starting material is trans-1,4-dichloro-2-butene containing about eight percent isomeric impurities. Chlorine is introduced at a rate of about 0.27 mole per hour into a solution of 0.049 mole of the dichlorobutene in 20 ml of carbon tetrachloride to which has been added 0.25 percent by weight, i.e., 5.6 × 10$^{-3}$ gram formula weight per kilogram, (based on reaction mixture, exclusive of chlorine) of methyltri($C_8$-$C_{10}$-alkyl)ammonium chloride ("Aliquat" 336, General Mills). After 12 minutes at 50°±5°C., 1.1 mole of chlorine per mole of dichlorobutene having been added, the solution is found by vapor phase chromatography to contain less than 0.5 percent of the original dichlorobutene, the yield being about 99 percent. The reaction product contains 90 percent meso-1,2,3,4-tetrachlorobutane, and 10 percent of the $d$,1-racemate.

When the experiment is repeated using only 0.025 percent catalyst (0.6 × 10$^{-3}$ gram formula weight per kilogram), the conversion of dichlorobutene is only 85 percent and the product contains about 58 percent meso-1,2,3,4-tetrachlorobutane, 32 percent of the $d$,1-racemate, and 10 percent other products.

EXAMPLES 3–5

The procedure of EXAMPLE 2 is repeated using the same starting dichlorobutene as in EXAMPLE 2 (except in EXAMPLE 5) and 0.2 gram of each catalyst (about 0.5 percent based on the reaction mixture exclusive of chlorine) in place of the catalyst of EXAMPLE 2. The table shows the conversions calculated from dichlorobutene consumed and the amounts of meso- and $d$,1-1,2,3,4-tetrachlorobutanes obtained (Yields of the 1,2,3,4-tetrachlorobutanes are nearly theoretical).

| Example | Chloride Ion Conc. | Catalyst | Conversion of Dichlorobutene % | Product Composition Weight Percent | |
|---|---|---|---|---|---|
| | | | | meso | d,l |
| 3 | 21 × 10$^{-3}$ gfw/kg | ($C_{12}$-$C_{16}$-alkyl)dimethylamine | 87 | 91 | 9 |
| 4 | 6 × 10$^{-3}$ gfw/kg | Pyridine[a] | 97 | 90 | 10 |
| 5[b] | 6 × 10$^{-3}$ | Pyridine[a] | 99 | 97 | 3 |

-continued

| Example | Chloride Ion Conc. gfw/kg | Catalyst | Conversion of Dichlorobutene % | Product Composition Weight Percent | |
|---|---|---|---|---|---|
| | | | | meso | d,l |

*63 × 10⁻³ moles/kg of pyridine is added. The chloride ion concentration of the reaction mixture is determined by analysis.
**In this example the starting dichlorobutene contains 97.5 percent trans-1,4-dichloro-2-butene.

EXAMPLE 8

I. This experiment illustrates the process of this invention run in the absence of a solvent in the same apparatus as described in EXAMPLE 1, starting with 29.5 g (0.235 mole) of dichlorobutene containing 92 percent trans-1,4-dichloro-2-butene to which has been added 0.25 g of the catalyst of EXAMPLE 1 (80% of active ingredient, giving 0.67 percent catalyst based on the reaction mixture exclusive of the chlorine; 18 × 10⁻³ gram formula weight per kilogram). Chlorine is added at the rate of 0.27 mole per hour at 70°–75°C for about 54 minutes. The final mole ratio of chlorine to dichlorobutene is 1.03. Conversion of dichlorobutene is found to be 97.5 percent; the ratio of meso- to $d,l$-isomers is 90:10; and the total yield of 1,2,3,4-tetrachlorobutane is virtually theoretical.

II. In another run, 1,4-dichloro-2-butene containing 95.3 percent of the trans-isomer is chlorinated to 40 percent conversion at 50°C. The product contains 95.6 percent meso- and 4.4 percent $d,1$-1,2,3,4-tetrachlorobutane. When the procedure is repeated, except that air is excluded by blanketing the reaction mixture with nitrogen, the product, 1,2,3,4-tetrachlorobutane contains only 70 percent of the meso-isomer and 30 percent of the $d,1$-racemate.

I claim:

1. A process for the preparation of meso-1,2,3,4-tetrachlorobutane in high yield by chlorination of trans-1,4-dichloro-2-butene, said process comprising contacting trans-1,4-dichloro-2-butene with elemental chlorine at about 0°–120°C. with efficient agitation and in the presence of oxygen at a partial gas pressure of at least 1 mm. of mercury and of at least $1 \times 10^{-3}$ gram formula weight of dissolved chloride ion per kilogram of reactor solution; said chloride ion being supplied by a compound selected from the group consisting of quaternary ammonium chloride, quaternary phosphonium chloride, tertiary sulfonium chloride, primary amine hydrochloride, secondary amine hydrochloride and tertiary.

2. The process of claim 1 wherein the total amount of chlorine contacted with trans-1,4-dichloro-2-butene is about 101–105% of the stoichiometric amount.

3. The process of claim 1 wherein the reaction temperature is about 70°–100°C.

4. The process of claim 1 wherein the chloride ion is supplied by a quaternary ammonium chloride.

5. The process of claim 1 carried out in the presence of a chlorination-resistant solvent.

6. The process of claim 5 wherein the solvent is carbon tetrachloride.

7. The process of claim 5 wherein the solvent constitutes up to about 80 weight percent of the reaction mass, exclusive of chlorine.

8. The process of claim 1 wherein the concentration of the soluble chloride ion is up to $100 \times 10^{-3}$ gram formula weight per kilogram of reactor solution.

9. The process of claim 1 wherein the maximum partial pressure of oxygen is 150 mm. of mercury.

10. The process of claim 1 wherein the concentration of chloride ion in the reaction solution is $2 \times 10^{-3}$ to $20 \times 10^{-3}$ gram formula weight per kilogram.

* * * * *